United States Patent [19]

Krishnan et al.

[11] Patent Number: 5,743,973
[45] Date of Patent: Apr. 28, 1998

[54] TIRE WITH ELECTRICALLY ORIENTED COMPOSITE

[75] Inventors: Ram Murthy Krishnan, Munroe Falls; Gary Thomas Belski, Massillon, both of Ohio

[73] Assignee: The Goodyear Tire & Rubber Company, Akron, Ohio

[21] Appl. No.: 814,957

[22] Filed: Mar. 10, 1997

[51] Int. Cl.$^6$ .............................. B60C 1/00; B60C 19/00; B60C 23/00

[52] U.S. Cl. ...................... 152/152.1; 152/510; 152/525; 152/548

[58] Field of Search ........................... 152/152.1, DIG. 2, 152/151, 450, 525, 510, 548; 361/212, 220, 216, 217

[56] References Cited

U.S. PATENT DOCUMENTS 2,441,945  5/1948  Frolich et al. .................. 152/152.1 X

*Primary Examiner*—Adrienne C. Johnstone
*Attorney, Agent, or Firm*—Henry C. Young, Jr.

[57] ABSTRACT

A rubber tire is provided which contains an electrically oriented composite within a rubber composition component of the tire, wherein said composite is composed of at least two electrically conductive metal elements in close proximity to each other and an electrically conductive rubber composition which is in contact with and electrically connects said metal elements together. The invention also contemplates an electrically resistive rubber composition within said tire rubber component which is juxtapositioned to at least a portion of said electrically conductive rubber composition and to at least a portion of at least one of said electrically conductive metal elements.

21 Claims, No Drawings

TIRE WITH ELECTRICALLY ORIENTED COMPOSITE

FIELD

A rubber tire is provided which contains an electrically oriented composite within a rubber composition component of the tire, wherein said composite is composed of at least two electrically conductive metal elements in close proximity to each other and an electrically conductive rubber composition which is in contact with and electrically connects said metal elements together. The invention also contemplates an electrically resistive rubber composition within said tire rubber component which is juxtapositioned to at least a portion of said electrically conductive rubber composition and to at least a portion of at least one of said electrically conductive metal elements.

BACKGROUND

For various applications it may be desired to (i) embed a plurality of two or more electrically conductive metal elements within a rubber component of a rubber tire and (ii) electrically connects at least two of such metal elements. Such metal elements may, for example, be in a form of wires, plates or other forms or configurations.

Due to the contemplated dynamic contortions of the various rubber components of the tire during the operational use of the tire, it is considered herein that a mechanical connection such as, for example, by soldering or otherwise mechanically fastening the metal elements together, is impractical. This is particularly in view of a realistic risk of the electrical connection being broken (i) during the fabrication and molding and curing of the tire or (ii) during the operation of the tire under conventional working conditions over time.

Accordingly, it is a feature of this invention that the metal elements be connected with an electrically conductive rubber composition.

An important requirement for such electrically conductive rubber composition is not only that it be relatively electrically conductive but, also, that it have physical properties suitable for inclusion within a tire component so that the electrical connection be maintained over time.

It is to be appreciated that it may also be desirable to provide an electrically insulative rubber composition next to, and preferably in contact with, or juxtapositioned to, at least a portion of at least one of the electrically conductive metal elements and/or the aforesaid electrically conductive rubber composition.

SUMMARY AND PRACTICE OF THE INVENTION

In accordance with this invention, a rubber tire is provided which contains an electrically oriented composite within at least a portion of a rubber component of the tire, wherein said composite is composed of (i) at least two electrically conductive metal elements in close proximity to each other without being fused or mechanically fastened together and (ii) a thin electrically conductive rubber composition which contacts and electrically connects said metal elements together; wherein the said electrically conductive rubber composition has a thickness in a range of about 0.1 to about 1, preferably in a range of about 0.2 to about 0.5, millimeters and an volume resistivity within a range of about 3 to about 200, alternately about 3 to about 100, and preferably about 3 to about 20, ohm-cm.

It is to be appreciated that the rubber composition of the tire component with which it is contemplated that the said electrically oriented composite is to be associated may typically have volume resistivity of at least $10^4$ and even up to at least $10^{10}$ ohm-cm or higher.

While such metal elements may be of various forms, it is contemplated that they may be in a form of wires, plates or other configurations.

While, in the practice of this invention, it is contemplated that a plurality of metal elements be electrically connected with an electrically conductive rubber composition, it is expected that from two to four metal elements will be electrically connected in which at least one of such elements is in a form of a wire. Such wire may be a solid metal wire or it may be of twisted metal filaments. In one embodiment, such solid wire or wire of twisted filaments may have a diameter in a range of about 0.4 to about 13, alternatively about 0.4 to about 6.5, millimeters.

In another aspect of the invention, the said metal element of the outer surface thereof may be of various electrically conductive metals such as, for example, steel, copper, alloys thereof including brass, and including steel wires which have a copper, brass or zinc coating thereon.

It is to be appreciated that the thin electrically conductive rubber composition can be laid over a portion of the said metal elements, be wrapped around one or more or the said metal elements, may encapsulate or partially encapsulate one or more of the said metal elements or, alternatively, at least one of the metal elements may be sandwiched between two strips of the conductive rubber composition. Other variations may occur to the practitioner.

In another aspect of the invention, the electrically oriented composite may be embedded or partially embedded in at least one rubber component of a tire, preferably a pneumatic tire. Such rubber component of the tire may be, for example, the tire's carcass, its sidewall, its innerliner, or other tire component as may occur to the practitioner. While it is usually desired that the electrically oriented composite is completely embedded within one or more components of the tire, it is envisioned that some part of the composite might not be completely embedded within a tire component and, thus, is exposed to the exterior of interior of the tire.

While a primary consideration of this invention is the creation of the electrically oriented composite, a secondary consideration is for the electrically conductive rubber composition to have suitable rubber properties to be relatively compatible with the tire component with which it is to be embedded, or at least partially embedded.

Accordingly, and in one aspect, it is desired for the vulcanized electrically conductive rubber composition to have physical properties such as an ultimate tensile strength at 23° C. in a range of about 10 to about 20 MPa, an ultimate elongation at 23° C. in a range of about 200 to about 300 percent, a 200 percent modulus at 23° C. of about 10 to about 15 MPa, a 100 percent modulus at 23° C. of about 4.5 to about 5.5 MPa and a Shore A hardness in a range of about 80 to about 90.

Representative elastomers for the conductive rubber composition are, for example, elastomers selected from at least one of homopolymers and copolymers of 1,3-butadiene and isoprene; copolymers of 1,3-butadiene and/or isoprene and a vinyl aromatic hydrocarbon such as styrene or alpha-methylstyrene; butyl and halobutyl rubber such as chlorobutyl and bromobutyl rubber; and natural rubber.

Representative examples of such elastomers are cis 1,4-polybutadiene, trans 1,4-polybutadiene, syndiotactic polybutadiene, polyisoprene whether natural or synthetic, styrene/butadiene copolymer rubber whether solution of aqueous emulsion polymerization prepared, isoprene/butadiene copolymer rubber, styrene/isoprene rubber and styrene/isoprene/butadiene terpolymer rubber.

In practice, such electrically conductive rubber composition is preferably primarily composed of natural cis 1,4-polyisoprene rubber or of trans 1,4-polybutadiene rubber insofar as its rubber content is concerned.

Accordingly, it is contemplated that the electrically conductive rubber composition may be comprised of, based upon 100 parts by weight rubber (phr), (A) elastomer(s) selected from (i) about 80 to about 100 phr of natural cis 1,4-polyisoprene rubber and/or trans 1,4-polybutadiene rubber containing at least 50 percent trans and at least about 15 percent vinyl content, preferably natural rubber and (ii) up to about 20 phr, alternately zero or from about 10 to about 20 phr, of (a) at least one diene based rubber selected from synthetic cis 1,4-polyisoprene, cis 1,4-polybutadiene, copolymers of isoprene and 1,3-butadiene, and copolymers of isoprene and/or 1,3-butadiene with a vinyl aromatic compound such as, for example, styrene and/or alpha-methylstyrene and/or (b) a copolymer as isobutylene and conjugated diene such as isoprene and/or halogenated copolymer of isobutylene and such conjugated diene, (B) about 50 to about 100, preferably about 75 to about 100, phr of carbon black having a particle size in a range of about 10 to about 30 nanometers (nm), an Iodine adsorption value in a range of about 190 to about 1500, alternatively about 190 to about 300, m$^2$/g, and a dibutyl phthalate (DBP) value in a range of about 110 to about 350, alternatively about 110 to about 200, cm$^3$/100 g so long as the sulfur cured, or vulcanized, rubber composition has the aforesaid volume resistivity within a range of about 3 to about 200, alternately about 3 to about 100, and preferably about 3 to about 20, ohm-cm. It is recognized that some adjustment may be made by the practitioner as to choice of elastomers or other rubber compounding ingredients, including carbon blacks, depending upon physical properties and level of volume resistivity desired which is considered herein to be within the skill of one having skill in the rubber compounding art.

Representative examples of carbon blacks contemplated for use in the electrically conductive rubber composition for the electrically oriented composite is, for example and not intended to be limited to carbon blacks with an ASTM designation of N472 or N294, as well as Black Pearl 2000, and Vulcan PA90, trademarks of and available from the Cabot Corporation. Acetylene carbon blacks are sometimes used.

In practice, it is contemplated herein that said electrically conductive metal elements are positioned within about 10, preferably within about 5 and more preferably within about 2, millimeters of each other. It is to appreciated that two or more of the metal elements may be abutting, or otherwise touching, each other.

The invention also contemplates the use of an electrically resistive, or relatively non-conductive, rubber composition positioned within said tire rubber component which is juxtapositioned to at least a portion of said electrically conductive rubber composition and to at least a portion of at least one of said electrically conductive metal elements; wherein said electrically insulative rubber composition has an volume resistivity of at least $10^{10}$ and even at least $10^{20}$ ohm-cm or more. Thus, its volume resistivity could be in a range of about $10^{10}$ to about $10^{20}$ ohm-cm.

In practice, such electrically resistive rubber composition may be comprised of, based upon 100 parts by weight rubber (phr), (A) at least one diene based rubber selected from homopolymers of isoprene and 1,3-butadiene, copolymers of isoprene and 1,3-butadiene, and copolymers of isoprene and/or 1,3-butadiene and a vinyl aromatic compound such as, for example, styrene and/or alpha-methylstyrene and/or (B) a copolymer as isobutylene and conjugated diene such as isoprene and/or halogenated copolymer of isobutylene and such conjugated diene, (C) from zero to about ten, preferably from zero to about five, phr of carbon black.

In practice, the rubber composition of the tire component of the tire in which the said electrically oriented composite is embedded is composed of one or more rubber components with each component being a rubber composition containing from about 25 to about 60 parts by weight rubber reinforcing carbon black per 100 parts by weight (phr) rubber and a volume resistivity of at least about $10^4$, usually at least about $10^{10}$, ohm-cm.

Thus, the rubber composition in which the composite is embedded has a substantially greater volume resistivity than the said electrically conductive rubber composition and preferably, although not necessarily, less volume resistivity than the said electrically resistive rubber composition.

Conventional rubber reinforcing carbon blacks which might be used in the rubber tire component of electrically resistive rubber composition include, for example and are not intended to be limited to, N-110, N-220, N-231, N-234, N-330, N-375 and N550.

The vulcanized electrically resistive rubber composition may have physical properties such as, for example, an ultimate tensile strength at 23° C. in a range of about 20 to about 30 MPa, an ultimate elongation at 23° C. in a range of about 600 to about 900 percent, a ten percent modulus at 23° C. of about 0.2 to about 0.5 MPa, a 100 percent modulus at 23° C. of about 1 to about 3 MPa and a Shore A hardness in a range of about 40 to about 55.

For the electrically non-conductive, or relatively high electrical resistive, rubber for use in this invention, it is preferred that the rubber composition have an electrical conductivity, or resistivity, in a range of about $10^{12}$ to about $10^{16}$ ohm-cm and at least $10^{10}$ ohm-cm greater than the electrical resistivity of the rubber matrix in which the aforesaid assembly is embedded.

The electrical volume resistivity for the non-conductive rubber composition and for a rubber tire component may be measured according to ASTM No. D257 and volume resistivity for the conductive rubber, primarily because its volume resistivity is very low, is more preferably measured by a Keithly Wave Tek DM25XT instrument obtained or obtainable from Keithly Instruments, or an equivalent instrument which can measure the relatively low volume resistivity of the rubber composition.

By the term "volume resistivity" it is meant the value calculated by the formula:

$$r=(R)(A)/1$$

where r is the volume resistivity in ohm-cm, R is resistance in ohms, A the cross-sectional area in cm$^2$ and 1 is length in cm. Thus, the volume resistivity is distinguished from simple resistance which is conventionally expressed in terms of ohms.

It is readily understood by those having skill in the art that the rubber compositions may be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of carbon blacks(s) for use in this invention have hereinbefore been discussed.

For the electrically conductive rubber composition to be used for the electrically oriented composite: Typical amounts of tackifier resins, if used, comprise about 0.5 to about 10 phr, usually about 1 to about 5 phr. Typical amounts of processing aids comprise about 1 to about 10 phr. Such processing aids can include, for example, aromatic, napthenic, and/or paraffinic processing oils, although usually only a minimal amount of oil, if any, is usually desired. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can preferably be primarily stearic acid, may comprise about 0.5 to about 5 phr. It is to be appreciated that stearic acid commonly used for rubber compounding purposes is typically composed of about 30 to about 80 weight percent stearic acid and the remainder being typically primarily composed of other saturated, fatty acids like saturated $C_{12}$, $C_{14}$, $C_{16}$ and $C_{20}$ chains. Such material, in such a relatively impure state, is commonly referred to in the rubber compounding practice as "stearic acid" and is so referred to in the description and practice of this invention. Typical amounts of zinc oxide can be, for example, about 2 to about 5, and sometimes even up to about 15, phr. Typical amounts of waxes comprise about 1 to about 5 phr. Often microcrystalline waxes are used. Typical amounts of peptizers, if used, comprise about 0.1 to about 1 phr. Typical peptizers, if used, may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.0 to about 3.5, sometimes from 2 to about 3 being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.0, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention The presence and relative amounts of the above additives are not considered to be an aspect of the present invention which is more primarily directed to the use of a conductive rubber composition in conjunction with at least partially embedding, or encapsulating as the case may be, the aforesaid composite in a rubber component of a tire.

The mixing of the rubber compositions can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, carbon black and other ingredients are mixed in one or more non-productive mix stages. The terms "non-productive" and "productive" mix stages are well known to those having skill in the rubber mixing art.

The said electrically oriented composite may be at least partially embedded in various rubber components of a tire example as hereinbefore discussed. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Two copper wires having diameters of about 0.25 inch, or about 0.6 cm, are contemplated as being embedded within a rubber component of a pneumatic tire, namely, a tire carcass, sidewall or innerliner rubber composition. An end of one the two copper wires is positioned to be within about one millimeter of an end of the other copper wire and the copper wires are not touching, soldered together or otherwise mechanically fastened together.

The aforesaid ends of the respective copper wires are electrically connected together with a small, thin, electrically conductive rubber strip of relatively low volume resistivity. The non-reinforcing composite, or assembly, of the electrical wires and strip of electrically conductive rubber composition are embedded in a tire component rubber composition.

The electrically conductive rubber strip was about one inch (2.54 cm) wide with a thickness of about 15–20 mils (about 0.4 to about 0.5 millimeters).

The carbon black reinforced rubber composition used for the electrically conductive rubber strip is demonstrated in the following Table 1 as Ex A.

The rubber composition used for an electrically insulative rubber, which may be positioned next to the electrically conductive strip against the surface and side of the strip opposite from the side of the strip which electrically connects the two electrical copper wires together, is demonstrated in the following Table 1 as Ex B.

TABLE 1

| Material | Parts Ex. A | Parts Ex. B |
| --- | --- | --- |
| Non-Productive Mix | | |
| Natural rubber[1] | 100 | 100 |
| Antidegradant | 2 | 2 |
| Carbon black (N472) | 95 | 0 |
| Carbon black (N550) | 0 | 3.8 |
| Silica[2] | 17 | 17 |
| Hard clay[3] | 0 | 17 |
| Antidegradant | 3 | 3 |
| Processing aids[4] | 4 | 4 |
| Stearic acid | 1 | 1 |
| Productive Mix | | |
| Zinc oxide | 10 | 10 |
| Antidegradant | 1 | 1 |
| Sulfur | 3.1 | 3.1 |
| Accelerators | 1.1 | 1.1 |

Conventional amounts of antidegradant(s) (paraphenylene diamine and hydroquinoline type), as well as fatty acid (stearic acid) zinc oxide, sulfur and accelerator of the sulfenamide type (curatives) were used.

1. Natural cis 1,4-polyisoprene rubber;
2. Silica obtained as Hi-Sil 243LD from the PPG company;
3. Bentonite type
4. Phenol formaldehyde resin and alkylated naphthenic aromatic hydrocarbon resin;

EXAMPLE II

The prepared rubber compositions were cured at a temperature of about 150° C. for about 36 minutes and the resulting cured rubber samples evaluated for their physical properties as shown in the following Table 2 as averages of the respective physical properties. The exemplary samples Ex. A and Ex. B correspond to the exemplary samples Ex. A and Ex. B of Example I.

TABLE 2

| Properties | Ex. A | Ex. B |
| --- | --- | --- |
| Modulus (200%), MPa | 11.6 | 2.1 |
| Modulus (50%), MPa | 3.2 | 0.8 |
| Tensile strength, ult (MPa) | 13.4 | 24.4 |
| Elongation (%) | 255 | 768 |
| Hardness, Shore A, 23° C. | 84 | 48 |
| Volume resistivity (ohm-cm)[1] | 10 | $0.3 \times 10^{14}$ |

1. The volume resistivity for Ex.B as determined by ASTM No. D257 and for Ex A by a Keithly Wave Tek DM25XT instrument obtained or obtainable from Keithly Instruments using a sample sheet having a length of about 16 cm long by about 11 cm wide by about 0.2 cm thick.

A typical volume resistivity for a sulfur vulcanized rubber tire component in which the composite, or assembly, is to be embedded is, for example, about $0.3 \times 10^{14}$ ohm-cm which is contemplated as being somewhat exemplary of a rubber composition containing about 45–55 phr of conventional rubber reinforcing carbon black.

The electrical property, or volume resistivity, for the sulfur vulcanized Ex. A sample, namely, the electrically conductive rubber composition for electrically connecting the ends of the copper wires together, was observed to be about 5 to 10 ohms-cm which is clearly and substantially, by a large magnitude, more electrically conductive than the aforesaid exemplary tire rubber component.

The electrical volume resistivity property for the sulfur vulcanized Ex B sample, namely, the electrically relatively non-conductive rubber composition, was observed to be about $10^{14}$ ohms-cm, which is clearly and substantially more electrically insulative than the rubber composition of Ex. A, although it is somewhat similar to that of the recited exemplary tire rubber composition.

Further, the physical properties of Ex's A and B are considered herein to indicate that the rubber compositions would be relatively compatible in a physical sense with a conventional rubber component of a tire.

While certain representative embodiments and details have been shown for the purpose of illustrating the invention, it will be apparent to those skilled in this art that various changes and modifications may be made therein without departing from the spirit or scope of the invention.

What is claimed is:

1. A rubber tire containing an electrically oriented non-reinforcing composite within a rubber composition component of the tire, wherein said composite is composed of (i) at least two electrically conductive metal elements in close proximity to each other and (ii) an electrically conductive rubber composition which contacts and electrically connects said metal elements together; wherein the said electrically conductive rubber composition has a thickness in a range of about 0.1 to about 1 millimeter and an electrical volume resistivity within a range of about 3 to about 200 ohm-cm.

2. The tire of claim 1 wherein the rubber composition of said tire component has an electrical volume resistivity of at least $10^4$ ohm-cm.

3. The tire of claim 1 wherein said metal elements are composed of, or have an outer surface composed of, at least one metal selected from the group consisting of steel, copper, and alloys thereof including brass.

4. The tire of claim 1 wherein at least one of said metal elements is in the form of a wire, defined as a solid wire or wire of twisted metal filaments, having a diameter in a range of about 0.4 to about 6.5 millimeters.

5. The tire of claim 3 wherein at least one of said metal elements is in the form of a wire, defined as a solid wire or a wire of twisted metal filaments.

6. The tire of claim 1 wherein said electrically conductive rubber composition is a sulfur vulcanized rubber composition characterized by having an ultimate tensile strength at 23° C. in a range of about 10 to about 20 MPa, an ultimate elongation at 23° C. in a range of about 200 to about 300 percent, a 200 percent modulus at 23° C. of about 10 to about 15 MPa, a 100 percent modulus at 23° C. of about 4.5 to about 5.5 MPa and a Shore A hardness in a range of about 80 to about 90.

7. The tire of claim 1 wherein said metal elements are composed of, or have an outer surface composed of, at least one metal selected from the group consisting of steel, copper and alloys thereof including brass, at least one of sail metal elements is in the form of a wire, defined as a solid wire or a wire of twisted metal filaments, having a diameter in a range of about 0.4 to about 6.5 millimeters and wherein the electrical volume resistivity of the electrically conductive rubber is in a range of about 3 to about 20 ohm-cm.

8. The tire of claim 1 wherein at least one of said metal elements is in the form of a wire, defined as a solid wire or a wire of twisted metal filaments, having a diameter in a range of about 0.4 to about 6.5 millimeters and wherein said electrically conductive rubber composition has an electrical volume resistivity in a range of about 3 to about 20 ohm-cm and is comprised of, based upon 100 parts by weight rubber (phr), at least one elastomer selected from the group consisting of homopolymers and copolymers of 1,3-butadiene and isoprene; copolymers of 1,3-butadiene and/or isoprene with styrene or alpha-methylstyrene; butyl rubber; halobutyl rubber selected from the group consisting of chlorobutyl rubber and bromobutyl rubber; and natural rubber.

9. The tire of claim 3 wherein at least one of said metal elements is in the form of a wire, defined as a solid wire or a wire of twisted metal filaments, having a diameter in a range of about 0.4 to about 6.5 millimeters and wherein said electrically conductive rubber composition has an electrical volume resistivity in a range of about 3 to about 20 ohm-cm and is comprised of, based upon 100 parts by weight rubber (phr), at least one elastomer selected from the group consisting of homopolymers and copolymers of 1,3-butadiene and isoprene; copolymers of 1,3-butadiene and/or isoprene with styrene or alpha-methylstyrene; butyl rubber; halobutyl rubber selected from the group consisting of chlorobutyl rubber and bromobutyl rubber; and natural rubber.

10. The tire of claim 1 wherein the said electrically conductive metal elements electrically connected with said electrically conductive rubber are positioned within about 5 millimeters of each other.

11. The tire of claim 3 wherein the said electrically conductive metal elements electrically connected with said electrically conductive rubber are positioned within about 5 millimeters of each other and wherein the electrically conductive rubber composition has an electrical volume resistivity in a range of about 3 to about 20 ohm-cm.

12. The tire of claim 6 wherein the said electrically conductive metal elements electrically connected with said electrically conductive rubber are positioned within about 5 millimeters of each other and wherein the electrically conductive rubber composition has an electrical volume resistivity in a range of about 3 to about 20 ohm-cm.

13. The tire of claim 8 wherein the said electrically conductive metal elements electrically connected with said electrically conductive rubber are positioned within about 5 millimeters of each other.

14. The tire of claim 1 wherein an electrically resistive, or relatively non-conductive, rubber composition is juxtapositioned to at least a portion of said electrically conductive rubber composition and to at least a portion of at least one of said electrically conductive metal elements; wherein said electrically resistive rubber composition has an electrical volume resistivity of at least $10^{10}$ ohm-cm.

15. The tire of claim 3 wherein an electrically resistive, or relatively non-conductive, rubber composition is juxtapositioned to at least a portion of said electrically conductive rubber composition and to at least a portion of at least one of said electrically conductive metal elements; wherein said electrically resistive rubber composition has an electrical volume resistivity of at least $10^{10}$ ohm-cm.

16. The tire of claim 8 wherein an electrically resistive, or relatively non-conductive, rubber composition is juxtapositioned to at least a portion of said electrically conductive rubber composition and to at least a portion of at least one of said electrically conductive metal elements; wherein said electrically resistive rubber composition has an electrical volume resistivity of at least $10^{10}$ ohm-cm.

17. The tire of claim 12 wherein an electrically resistive, or relatively non-conductive, rubber composition is juxtapositioned to at least a portion of said electrically conductive rubber composition and to at least a portion of at least one of said electrically conductive metal elements; wherein said electrically resistive rubber composition has an electrical volume resistivity of at least $10^{10}$ ohm-cm.

18. The tire of claim 1 wherein said electrically conductive rubber composition contains at least one carbon black which is selected from the group consisting of carbon black having an ASTM designation of N472 and N294.

19. The tire of claim 3 wherein said electrically conductive rubber composition contains at least one carbon black which is selected from the group consisting of carbon black having an ASTM designation of N472 and N294.

20. The tire of claim 8 wherein sail electrically conductive rubber composition contains at least one carbon black which is selected from the group consisting of carbon black having an ASTM designation of N472 and N294.

21. The tire of claim 12 wherein said electrically conductive rubber composition contains at least one carbon black which is selected from the group consisting of carbon black having an ASTM designation of N472 and N294.

* * * * *